US007085761B2

(12) United States Patent
Shibata

(10) Patent No.: US 7,085,761 B2
(45) Date of Patent: Aug. 1, 2006

(54) PROGRAM FOR CHANGING SEARCH RESULTS RANK, RECORDING MEDIUM FOR RECORDING SUCH A PROGRAM, AND CONTENT SEARCH PROCESSING METHOD

(75) Inventor: Ryu Shibata, Shizuoka (JP)

(73) Assignee: Fujitsu Limited, Kawasaki (JP)

( * ) Notice: Subject to any disclaimer, the term of this patent is extended or adjusted under 35 U.S.C. 154(b) by 467 days.

(21) Appl. No.: 10/305,178

(22) Filed: Nov. 27, 2002

(65) Prior Publication Data

US 2004/0002945 A1 Jan. 1, 2004

(30) Foreign Application Priority Data

Jun. 28, 2002 (JP) ............................. 2002-189753

(51) Int. Cl.
*G06F 17/30* (2006.01)

(52) U.S. Cl. ........................................................ 707/5

(58) Field of Classification Search ................... 707/5, 707/10, 3, 4
See application file for complete search history.

(56) References Cited

U.S. PATENT DOCUMENTS 6,418,433 B1 *   7/2002  Chakrabarti et al. ........... 707/5
6,665,655 B1 *  12/2003  Warner et al. .................. 707/2
6,766,316 B1 *   7/2004  Caudill et al. ................. 707/3
2002/0062368 A1 *  5/2002  Holtzman et al.
2002/0129015 A1 *  9/2002  Caudill et al.
2004/0111408 A1 *  6/2004  Caudill et al.

OTHER PUBLICATIONS

Patent Abstract of Japan, Publication No. 08212232 A, Aug. 20, 1996.

* cited by examiner

*Primary Examiner*—Greta Robinson
(74) *Attorney, Agent, or Firm*—Staas & Halsey LLP

(57) ABSTRACT

In the present invention, information for content, software or both that a user set as a desired operation target of a content search rank changing process is stored in a operation target management table. Information for software active during a content search processing is stored in a currently active software management table. In case the content or software relates to the retrieved content as search results is present in the operation target management table or the currently active software management table, the relevancy rating of the retrieved content is calculated by adding a prescribed value to the relevancy rating of the retrieved content. Then, the retrieved content is sorted based on the relevancy rating and outputted in order sorted at a display device.

8 Claims, 9 Drawing Sheets

| No. | CONTENT FILE NAME | SOFTWARE FILE NAME |
|---|---|---|
| 1 | C:\pcd\document.html | C:\pcd\bin\pcd.exe |
| 2 | C:\pcd\pcd.chm | C:\pcd\exe\abcd.exe |
| 3 | C:\pcd\readme.txt | C:\pcd\bin\pcd.exe |
| ⋮ | ⋮ | ⋮ |

| No. | SOFTWARE FILE NAME |
|---|---|
| 1 | C:\Program Files\prog\abc.exe |
| 2 | C:\Program Files\exe\xyz.exe |
| ⋮ | ⋮ |
| 10 | C:\pcd\exe\abcd.exe |

FIG.10

| No. | (ACTIVE) SOFTWARE FILE NAME |
|---|---|
| 1 | C:\pcd\bin\pcd.exe |
| 2 | C:\pcd\exe\xyz.exe |
| ⋮ | ⋮ |
| ⋮ | ⋮ |

| No. | CONTENT FILE NAME | RELEVANCY RATING |
|---|---|---|
| 1 | C:\pcd\document.html | 200 |
| 2 | C:\pcd\pcd.chm | 195 |
| ⋮ | ⋮ | ⋮ |
| ⋮ | ⋮ | ⋮ |

44

PROGRAM FOR CHANGING SEARCH RESULTS RANK, RECORDING MEDIUM FOR RECORDING SUCH A PROGRAM, AND CONTENT SEARCH PROCESSING METHOD

BACKGROUND OF THE INVENTION

1. Field of the Invention

This invention relates to a technology for implementing processing on a computer to change the ranking of retrieved content when a user wishing to resolve problems relating to software searches user support content such as help files, question and answer (Q and A) files and the like stored on a computer or a content server.

2. Description of the Related Art

"Ranking" is a value specifying the rank of data, such as the output order, while outputting the results of content search processing. Further, "content" means user support data defined or recommended by the information provider such as, for example, a software operating procedure.

When a user does not understand how to operate a software product, when a problem relating to the software occurs or the like, he/she searches user support content such as help files, Q and A files, case example files and the like stored within computers or servers using the content search system. A content search system assigns a rank to each of retrieved content based on a type of score, and outputs the content lined up individually based on this ranking as a search results table. The ranking of the search results may be based on information such as simply the order of appearance of the content, the order of frequency of appearance of a keyword, or the like.

Rather than simply limited words and phrases expressing problems considered to resolve, a user attempts to solve problems by searching target content such as example descriptions and corrective ways on search conditions including words and phrases indicating the name of software wished to solve a problem for or the software itself as a search keyword.

The user can then search out useful information by referring to the content of the search results outputted with a rank assigned based on order of appearance of content or frequency of appearance of a keyword etc. one at a time. The content displayed at the top of the search results table can usually be considered to have a high degree of usefulness, and the user then refers to the table starting from the top of the search results table or from content near the top of the table. The user therefore wishes to have the content that is the most useful to he/she to be the upper order ranking of the search results.

Further, timing of when a user carries out a content search process can be considered when some kind of problem has occurred with the software in-use. There is therefore a high probability that information relating to software used when the user is making a content search or information relating to software used until recently will be useful as information required by the user.

In related user support and content search systems, content is generally just outputted according to ranking assigned to search results based on content order of appearance or keyword frequency of appearance. The content that is highly useful to the user is therefore not limited to the upper order of the search results ranking. The ranking of the content search system search results is such that which content the user wishes to refer to is decided by data such as the search keywords regardless of the situation of the individual user and cannot take into consideration usefulness for the individual user.

In related user support and content search systems, content useful in problem-solving that the user wishes to refer to is not limited to the upper order of the ranking and the user therefore has to repeat operations such as searching and referring until the appropriate desired content is found.

SUMMARY OF THE INVENTION

A general object of the present invention is to provide a program for changing a relevancy rating assigned to content retrieved in a content database search process on a computer, which program is capable considering the situation of individual users in the content ranking of search results.

A more specific object of the present invention is to provide a program for changing a relevancy rating assigned to retrieved content in such a manner that content relating to software or content which is set as an operation target by a user.

Another specific object of the present invention is to provide a program for changing a relevancy rating assigned to retrieved content in such a manner that a prescribed value is added to the relevancy rating of content relating to software which is used when the user is making the content search process or relating to software that has been used just before starting the content search process.

Other objects and advantages of the present invention will become apparent from the detailed description of the preferred embodiments to follow taken in conjunction with the appended claims.

In accordance with the present invention, there is provided a program for changing a relevancy rating assigned to content retrieved, which program may cause a computer to execute processes of acquiring information for software which is active during the content database search process and storing the information for software in a currently active software management table; calculating a relevancy rating of retrieved content by adding a prescribed value to the relevancy rating of the retrieved content in case information for software relating to the retrieved content is present in the currently active software management table; storing information of the retrieved content assigned in the relevancy rating in a search results management table; and sorting the retrieved content of the search results management table based on the relevancy rating and outputting a prescribed part of the retrieved content in order sorted.

The present invention provides a program may cause a computer to execute processes of acquiring information for software which has been active during the immediate past while the content database search process is executing and storing the information for software in an active software history management table; calculating a relevancy rating of retrieved content by adding a prescribed value to the relevancy rating of the retrieved content in case information for software relating to the retrieved content is present in the active software history management table; storing information of the retrieved content assigned in the relevancy rating in a search results management table; and sorting the retrieved content of the search results management table based on the relevancy rating and outputting a prescribed part of the retrieved content in order sorted.

The present invention also provides a recording medium for recording a program for changing a relevancy rating assigned to content retrieved causing a computer execute processes in aforementioned manner.

The present invention further provides a method for searching a content database stored in a computer using a keyword inputted by a user, comprises receiving operation target information for content, software, or both that a user has set as a desired target of relevancy rating changing and storing the operation target information in an operation target management table; searching a content database with the keyword and retrieving content as search result; changing a relevancy rating of the retrieved content in case the software relating to the retrieved content is active during the database search process and the retrieved content matches with the content of the operation target information stored in the operation target management table; and moving up the output rank of the retrieved content and outputting a prescribed part of the retrieved content.

The present invention further provides a method for searching a content database stored in a computer using a keyword inputted by a user, comprises receiving operation target information for content, software, or both that a user has set as a desired target of relevancy rating changing and storing the operation target information in an operation target management table; receiving notification indicating software turned to be active and storing the notification in an active software history management table; searching a content database with the keyword and retrieving content as search result; changing relevancy rating of the retrieved content in case the retrieved content matches with the content or relates to the software of the operation target information in the operation target management table, and when software relating to the retrieved content matches with the software indicated in notification stored in the active software history management table; and moving up the output rank of the retrieved content and outputting a prescribed part of the retrieved content.

The present invention also receives and stores information for content or information for software the user has set as a desired operation target of a relevancy rating changing process in an operation target management table when searching the content database. Further, information for software having been active just before starting a content database search process is acquired and stored in the active software history management table. A prescribed value is then added to the relevancy rating of the retrieved content when the content constituting the search results (retrieved content) matches with content information stored in the operation target management table.

Moreover, information for the software active during the content database search processing is acquired and stored in the currently active software management table. When information for software relating to the retrieved content is present in the currently active software management table, a prescribed value is added to the relevancy rating of the retrieved content and relevancy rating is calculated. When information for software relating to this retrieved content is present in the active software history management table, a prescribed value is added to the relevancy rating of the retrieved content and relevancy rating is calculated. The retrieved content assigned with a relevancy rating is then stored in the search results management table, and the retrieved content is output at a display device lined up in order based on the relevancy rating. As a result, when the results of searching the content database are displayed, content relating to content or software specified by the user or content relating to software currently or recently active is displayed in the higher ranks of a list for the search results. Problem solving can therefore be carried out in a manner where it is easy for a user to find content that they themselves wish to refer to.

BRIEF DESCRIPTION OF THE DRAWINGS

FIG. 10 is a view showing an example of a management table for currently active software.

FIG. 11 is a view showing an example of a search results management table.

DETAILED DESCRIPTION OF THE PREFERRED EMBODIMENTS

Figure 1:
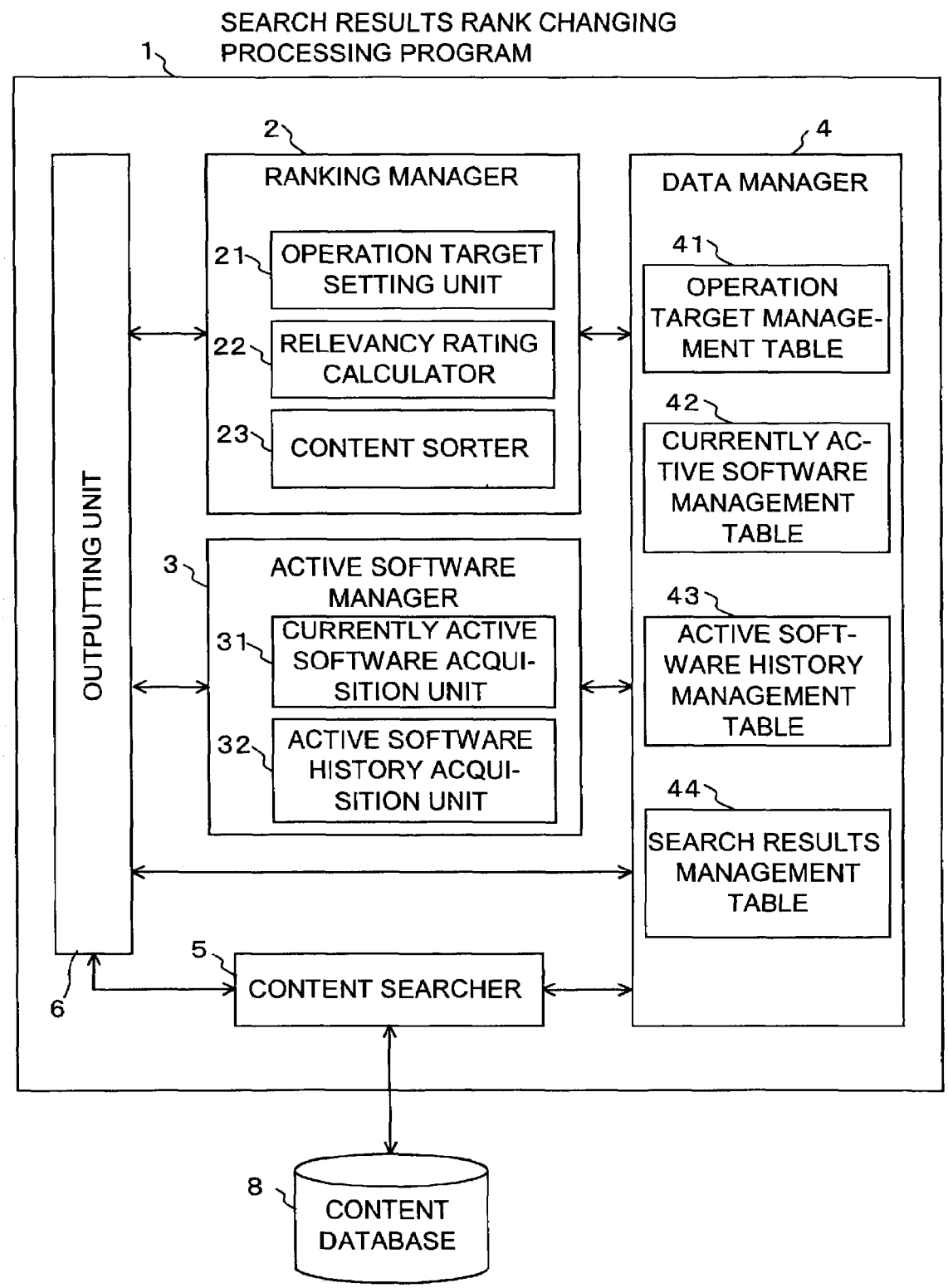
FIG. 1 is a view showing an example configuration for each processing part of a search results rank changing processing program of an embodiment of the present invention.

The following is a description of the preferred embodiments of the present invention. A view of an example configuration for each processing part of a search results rank changing processing program of an embodiment of the present invention is shown in FIG. 1. A search results rank changing processing program 1 is implemented as a processing program installed and executed on a computer.

A search results rank changing processing program 1 comprises a ranking manager 2, an active software manager 3, a data manager 4, a content searcher 5 and an outputting unit 6. The search results rank changing processing program 1 is capable of acquiring data from basic software such as an operating system (OS) of a computer via an Application Program Interface (API).

The ranking manager 2 manages a relevancy rating assigned to each of content of the search results retrieved from a content database 8 by the content searcher 5. Here, "a relevancy rating" is a value for deciding the rank of content such as output order when outputting the search results of the content searcher 5 to a display device connected to a computer. The search results of the content searcher 5 are outputted lined up in ascending order or descending order according to the value of the relevancy rating assigned to each of content by the ranking manager 2. The active software manager 3 is means for managing the software activation conditions and software activation history for programs for other applications within the computer where the search results rank changing processing program 1 is executed. The data manager 4 is means for managing various data used by the search results rank changing processing program 1. The outputting unit 6 is means for outputting data generated by the search results rank changing processing program 1 to a display device (not shown) connected to the computer.

The ranking manager 2 comprises an operation target setting unit 21, a relevancy rating calculator 22, and a content sorter 23. The operation target setting unit 21 is means for defining the names of content files and software files taken as targets of search results rank changing processing according to data inputted by the user. The content file names and software file names determined by the operation target setting unit 21 are stored in an operation target management table 41 of the data manager 4. The content file names refer to information specifying each of content constituting the content database 8 and are, for example, data file names for user support data. The software file names refer to information specifying software and are, for example, names of executable software files. The relevancy rating calculator 22 is means for assigning a relevancy rating to retrieved content resulting from processing at the content searcher 5. Each of content of the search results and the relevancy rating thereof is stored in a search results management table 44. The content sorter 23 is means for sorting the content file names stored at the search results management table 44 based on the relevancy rating and for outputting the content of sorted content files.

The active software manager 3 comprises a currently active software acquisition unit 31 and an active software history acquisition unit 32. The currently active software acquisition unit 31 is means for acquiring names of software files that are active on the computer while the content search processing is executed by the content searcher 5. The currently active software acquisition unit 31 stores the names of the software files that are currently active acquired from the OS of the computer via the API in a currently active software management table 42. The active software history acquisition unit 32 is means for acquiring the history of software active on the computer. The active software history acquisition unit 32 interrogates the computer OS as to the activation of the software via the API at prescribed periods or prescribed times. When notification is given from the computer of the activation of other software, the file names of the software for which notification is given are stored in an active software history management table 43 in order of notification.

The data manager 4 is means for storing in and managing the operation target management table 41, the currently active software management table 42, the active software history management table 43 and the search results management table 44. The operation target management table 41 is a data table for storing content file names and software file names to be taken as operating targets set by the user in a data table. The currently active software management table 42 is a data table for storing file names of software active on the computer during a content search. The active software history management table 43 is a data table for storing the file names of the software active within the computer in order of activation notification. The search results management table 44 is a data table for storing content name and relevancy rating of search results of the content searcher 5.

The content searcher 5 is means for searching the content database 8. The search processing is implemented using various existing processing methods. The content database 8 is a database for storing content constituted by data or data file such as help information, questions and answers, usage examples and the like taken as content. The outputting unit 6 is means for carrying out process in order to output various data acquired or generated by the search results rank changing processing program 1 to a display device of the computer.

It is considered that, when the user support content search processing is carried out, a user prefers that retrieved content relating to the software being used or recently used by himself/herself has a tendency to be displayed in order at the top of a search results table or at a position corresponding to the top.

First, the ranking manager 2 of the search results rank changing processing program 1 carries out process to set content and software to be taken as an operation target of the rank changing process in order to output the content of the software the user wishes to specify at upper ranks of the search results.

Figure 2:
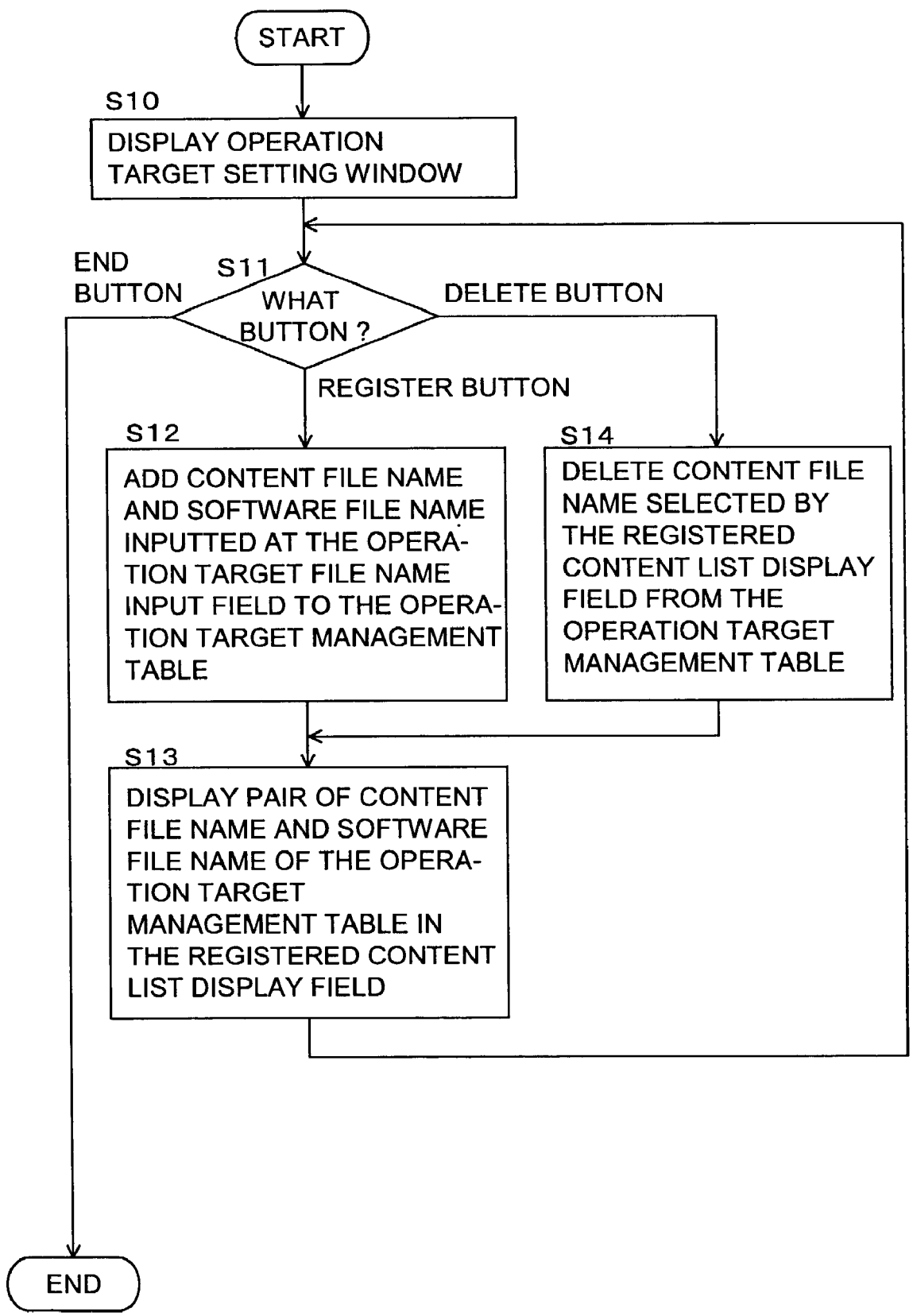
FIG. 2 is a view showing a process flow of an operation target setting process.

FIG. 2 is a view showing a process flow for an operation target setting process of changing relevancy rating. The operation target setting unit 21 of the ranking manager 2 displays an operation target setting window 100 via the outputting unit 6 at a display device connected to the computer (step S10).

Figures 3, 4:
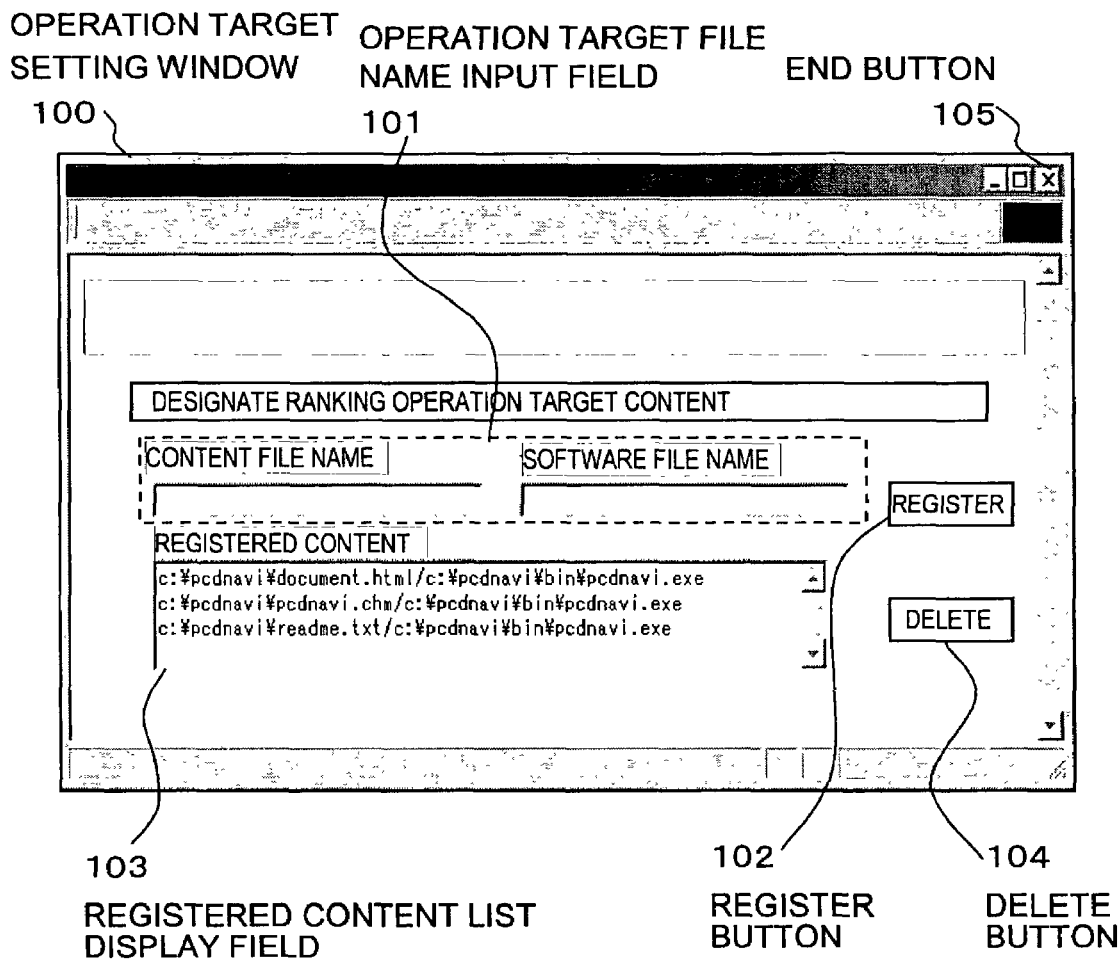
FIG. 3 is a view showing an example of a window for an operation target setting process.
FIG. 4 is a view showing an example of an operation target management table.

FIG. 3 shows an example of an operation target setting window. The operation target setting window 100 comprises an operation target file name input field 101, a register button 102, a registered content list display field 103, a delete button 104, and an end button 105. The user sets an operation target by inputting a content name (a content file name) and a software file name for which the relevancy rating in the search results they are wished to make high ranking at the operation target file name input field 101 of the operation target setting window 100 and clicking the register button 102. On the other hand, when it is wished to delete the content and software registered as the operation target, the user selects the content file name displayed at the registered content list display field 103 and clicks the delete button 104.

The operation target setting unit 21 determines whether the button has been clicked (step S11). If the button that has been clicked is the register button 102, the operation target setting unit 21 receives the content file name and software file name inputted at the operation target file name input field 101 and adds the content file name and software file name to the operation target management table 41 as a pair (step S12).

FIG. 4 shows an example of an operation target management table. When a content file name "C:\pcd\document.html" and a software file name "C:\pcd\bin\pcd.exe" are inputted as the content file name and software file name of the operation target file name input field 101 of the operation target setting window 100 of FIG. 3, the pair consisting of the content file name "C:\pcd\document.html" and the software file name "C:\pcd\bin\pcd.exe" are stored as the No. 1 record of the operation target management table 41.

After this, the pair of the content file name and the software file name of the operation target management table 41 are displayed at the registered content list display field 103 of the operation target setting window 100 (step S13). If the button clicked in the process of step S11 is the delete button 104, the operation target setting unit 21 deletes the pair of the content file name and the software file name selected from the list of the registered content list display field 103 from the operation target management table 41 (step S14). If the button clicked in the process of step S11 is the end button 105, the process ends.

In order to change the ranking of content of software that the user has been using up until recently to a high ranking, the active software manager 3 acquires the activation history of software active on the computer and stores this in the active software history management table 43. The number of software files registered in the active software history management table 43 is taken to be ten.

Figure 5:
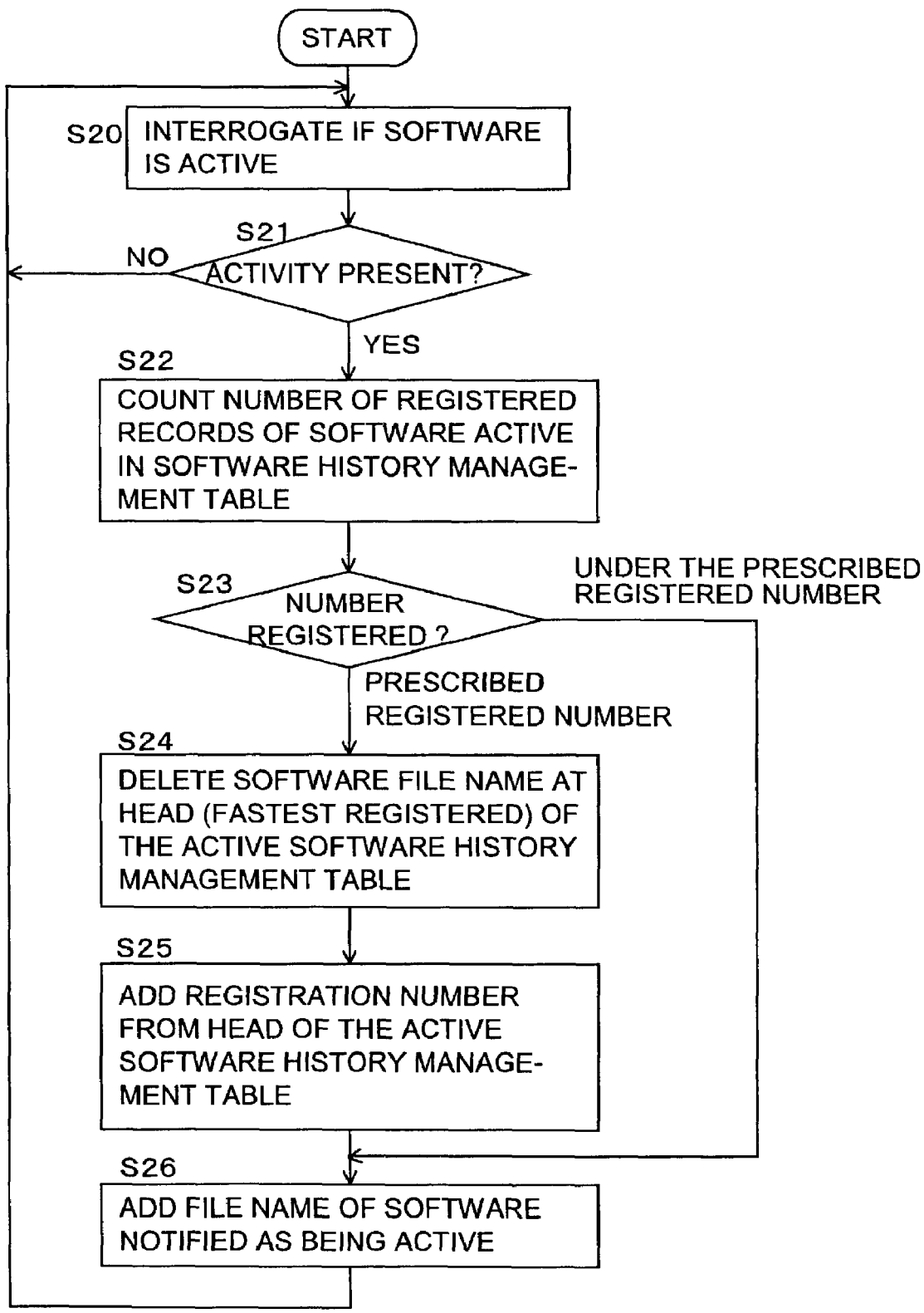
FIG. 5 is a view showing a process flow for an active software history acquisition process.

FIG. 5 shows a process flow for an active software history acquisition process. The active software history acquisition unit 32 of the active software manager 3 interrogates the computer OS as to whether or not software is active within the computer via an API (step S20). If there is software active, when notification of this is received (step S21), the number of items of software registered in the active software history management table 43 is counted (step S22). If the number registered in the active software history management table 43 is a prescribed number (ten in this case) (step S23), the top (No. 1) record of the active software history management table 43, that is the fastest software file name registered, is deleted (step S24). Then, the registration numbers from the top of the active software history management table 43 are renumbered (step S25), and the file name of the software for which notification of activation has been given is added to the end (No. 10) of the active software history management table 43 (step S26).

Figures 6, 7:
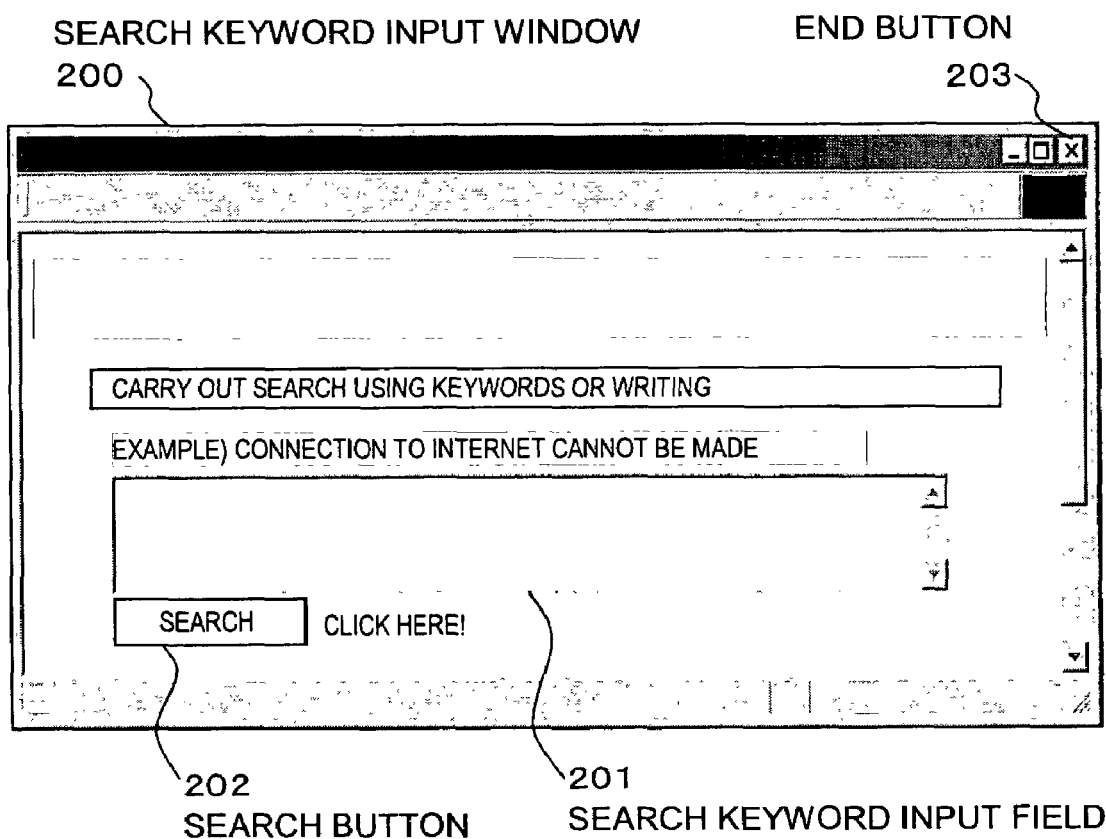
FIG. 6 is a view showing an example of an active software history management table.
FIG. 7 is a view showing an example of a window for a search keyword inputting process.

On the other hand, if the number registered for the active software history management table 43 is less than the prescribed number (ten in this case) (step S23), the software file name for which notification of activation has been given is added to the end of the active software history management table 43 (step S26). FIG. 6 shows an example of the active software history management table 43. When the active software history acquisition unit 32 receives notification of software activation, the executable file name of this software is registered in order from No. 1 record the top of the active software history management table 43. The active software history management table 43 shown in FIG. 6 shows that names of ten items of software (software executable file names) have been registered in order from the oldest time of activation in the order "C:\ProgramFiles\prog\abc.exe", "C:\ProgramFiles\exe\xyz.exe", and "C:\pcd\exe\abcd.exe".

After this, the user carries out a user support content search. The content searcher 5 displays a search keyword input window 200 via the outputting unit 6 and the content database 8 is searched using the inputted search keywords. FIG. 7 shows an example of a search keyword input window 200. The content searcher 5 starts to search the content database 8 storing content relating to user support as a result of the user inputting words or sentences constituting keywords at a search keyword input field 201 of the search keyword input window 200. When the end button 203 of the search keyword input window 200 is clicked, the content search process ends.

Figure 8:
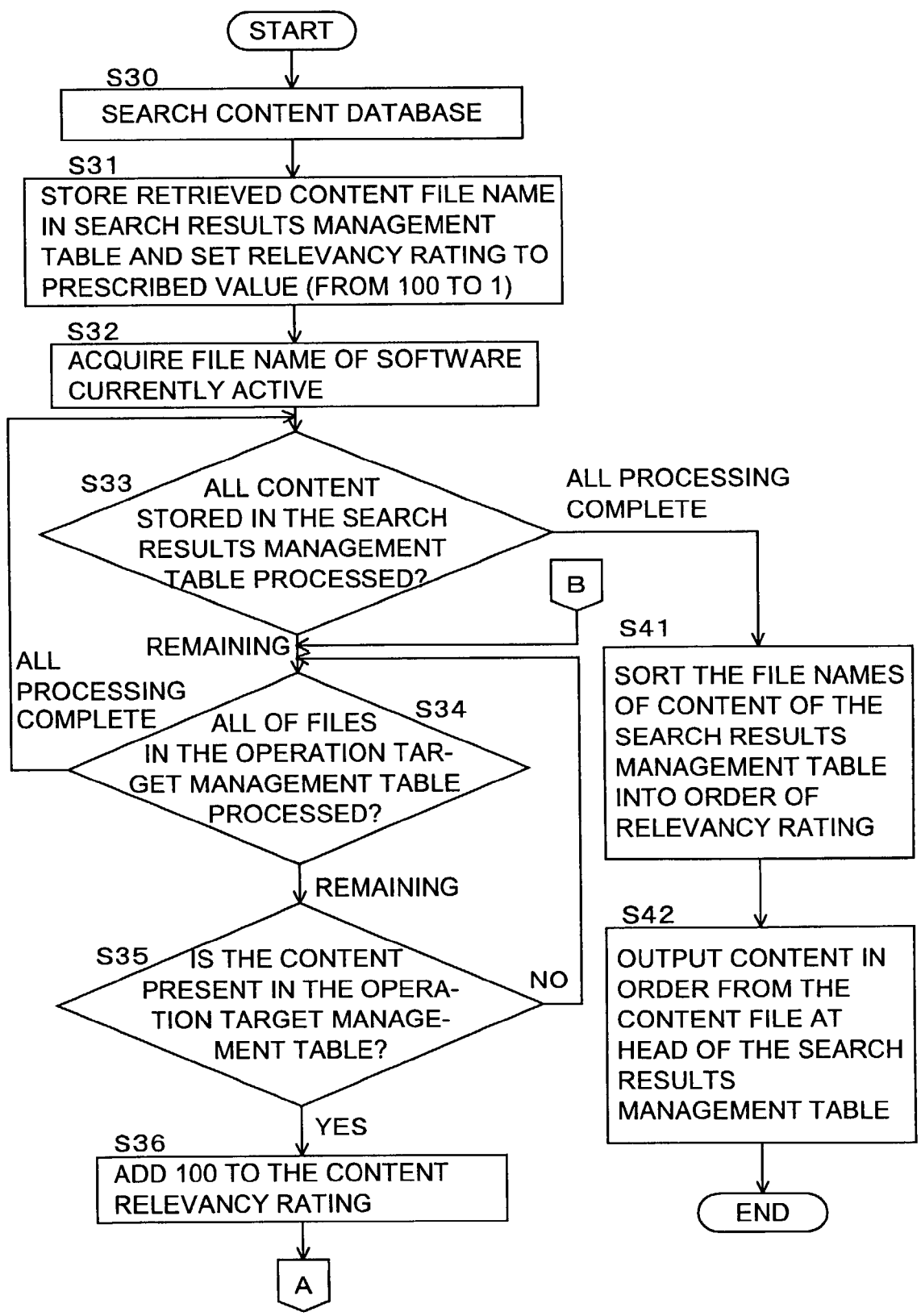
FIG. 8 is a view showing a process flow for a content search process and a rank changing process.
Figure 9:
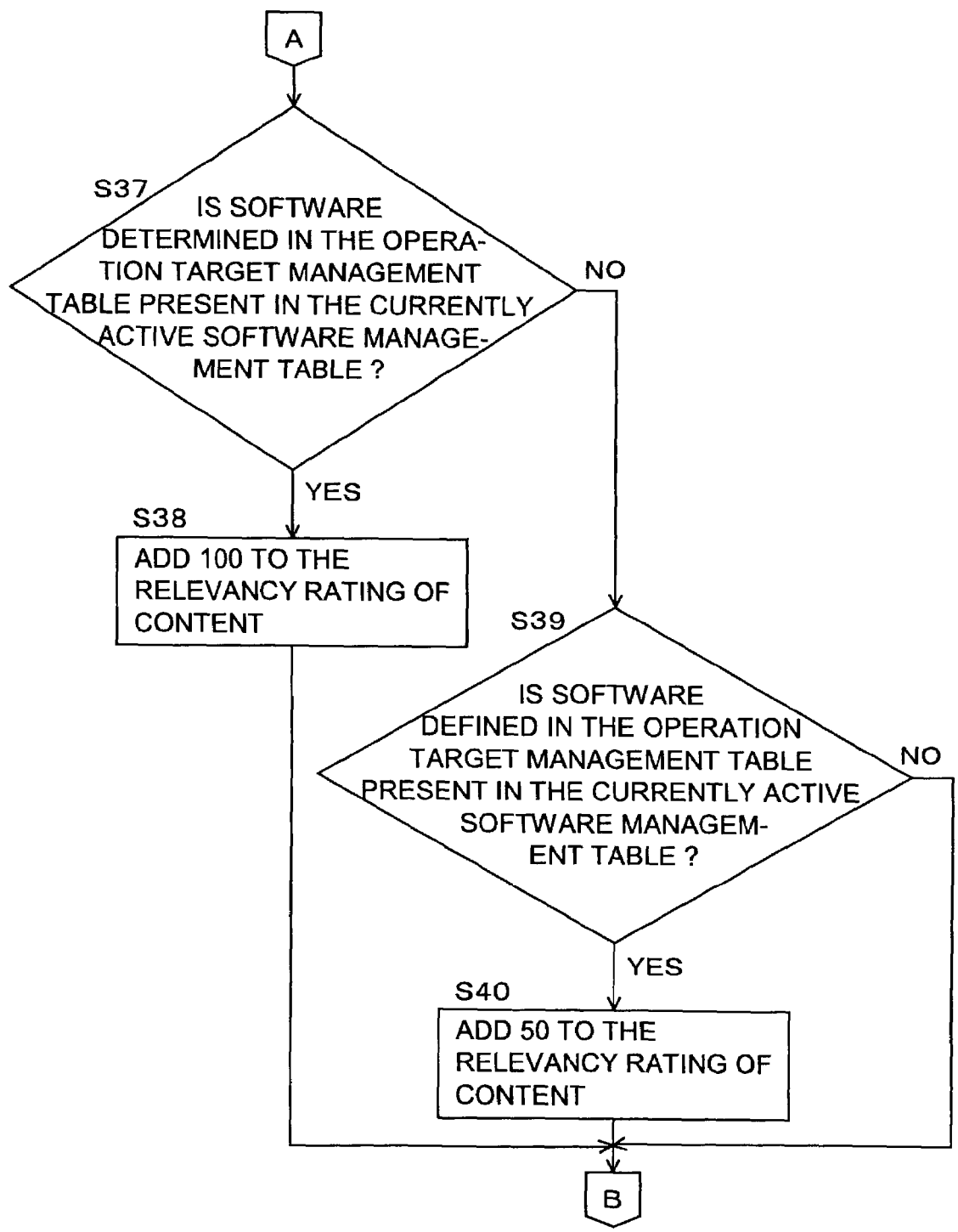
FIG. 9 is a view showing a process flow for a content search process and a rank changing process.

FIG. 8 and FIG. 9 show process flows for a content search process and a rank changing process. The content searcher 5 searches the content database 8 stored within the computer (step S30). The search process carried out by the content searcher 5 is the same as related data search processing and a detailed description thereof is therefore omitted.

The relevancy rating calculator 22 stores all of the file names for content searched by the content searcher 5 in the search results management table 44 and a prescribed relevancy rating is set for each content file (step S31). In other words, the relevancy rating calculator 22 stores the file name of content searched by the content searcher 5 in the search results management table 44 in order from the top. The relevancy rating calculator 22 then adds a relevancy rating that goes from, for example, a range of 100 to 1 while reducing 5 at a time in order from the content at the top. The currently active software acquisition unit 31 of the active software manager 3 acquires file names of currently active software from the OS of the computer via the API and stores this in the currently active software management table 42 (step S32). FIG. 10 shows an example of a currently active software management table. For example, if the executable files "C:\pcd\bin\pcd.exe" and "C:\pcd\exe\xyz.exe" are currently active, these file names are determined at the currently active software management table 42.

The processes from step S33 to step S40 are then carried out for the content files stored in the search results management table 44. First, the relevancy rating calculator 22 determines whether or not the content files stored in the search results management table 44 have all been processed (step S33). If unprocessed content files still remain in the search results management table 44, a determination is then made with regards to the content files as to whether or not all of the files determined in the operation target management table 41 have been processed (step S34). If there are still unprocessed files in the operation target management table 41, a determination is made as to whether or not the content files of the search results management table 43 exist in the operation target management table 41 (step S35). If the retrieved content is present in the operation target management table 41, a value of one hundred (100) is added to the relevancy rating of the content file (step S36).

Further, a determination is then made as to whether or not the software file name corresponding to the content file determined in the operation target management table 41 exists in the currently active software management table 42 (step S37). When the software file name determined in the operation target management table 41 exists in the currently active software management table 42, a value of one hundred (100) is added to the relevancy rating of the content of the search results management table 44 (step S38).

On the other hand, in the process in step S37, when the software file name determined in the operation target management table 41 does not exist in the currently active software management table 42, a determination is made as to whether or not the software file name determined in the operation target management table 41 exists in the active software history management table 43 (step S39). If the software file name does exist in the active software history management table 43, a value of fifty (50) is added to the relevancy rating of the content of the search results management table 44 corresponding to the software file name (step S40).

The processes from step S35 to S40 are then carried out for each file determined in the operation target management table 41. If processing is complete for all of the files (step S34), the processing is returned to the process in step S33. If the processing from step S34 onwards is then finished for each content of the search results management table 44 (step S33), the content file names of the search results management table 44 are sorted in order of largest relevancy rating (step S41).

The outputting unit 6 acquires a portion previously decided upon as the display content from the top content file of the search results management table 44, displays this at the display device (step S42), and the process ends.

An example of a search results management table 44 after rank changing processing is shown in FIG. 11. For example, it is assumed that a content file "C:\pcd\document.html" is lower ranked of the search results of the content searcher 5 and is taken that a relevancy rating is therefore not initially assigned (relevancy rating=0). It is also assumed that a content file "C:\pcd\pcd.chm" is positioned in the middle of the search results of the content searcher 5 and it is therefore taken that the initially provided relevancy rating is 45.

The content file "C:\pcd\document.html" is set at the operation target management table 41 of FIG. 4 and value 100 is therefore added to the relevancy rating. Further, the corresponding software file "C:\pcd\bin\pcd.exe" is registered in the currently active software management table 42 of FIG. 10 and further value 100 is therefore added to the relevancy rating so that the final relevancy rating becomes 200. The content file "C:\pcd\pcd.chm" is set at the operation target management table 41 of FIG. 4 and value 100 is therefore added to the relevancy rating. Further, the corresponding software file "C:\pcd\exe\abcd.exe" is registered in the active software history management table 43 of FIG. 6 and further value 50 is therefore added to the relevancy rating so that the final relevancy rating is 195.

After the content files of the search results management table 44 are sorted according to relevancy rating, as shown in FIG. 11, the content files "C:\pcd\document.html" and "C:\pck\pcd.chm" become the (first and second) upper ranked content of the search results management table 44 in accordance with the changed relevancy rating. The outputting unit 6 displays the prescribed content of these content files being ranked at first and second of a search ranking list in a search results display window 300.

Figure 12:
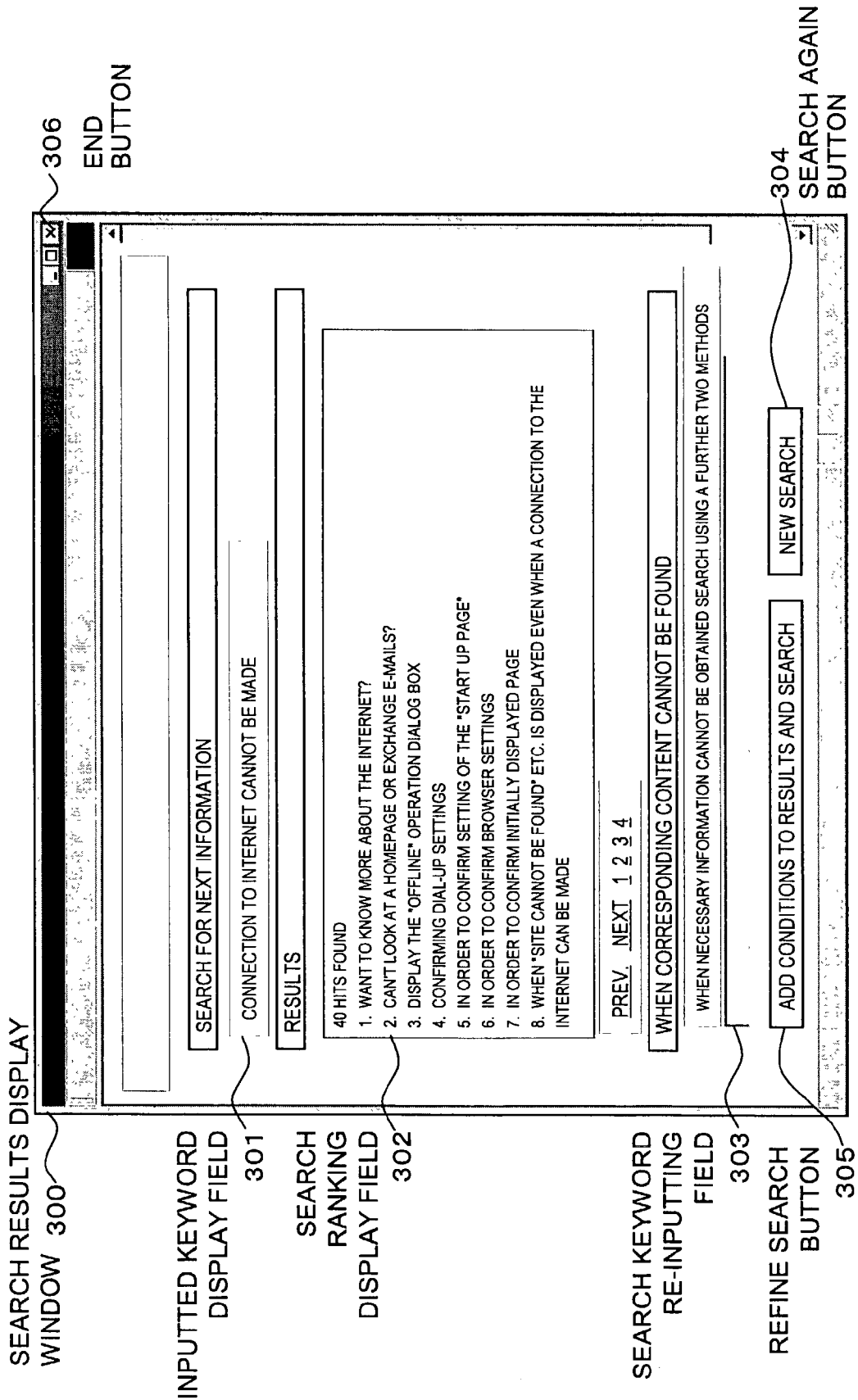
FIG. 12 is a view showing an example of a window for a search results display.

FIG. 12 shows an example of a search results display window. A search results display window 300 comprises an inputted keyword display field 301, a search ranking display field 302, a search keyword re-input field 303, a search-again button 304, a refine search button 305, and an end button 306. Search keywords inputted at the search keyword input field 201 shown in FIG. 7 are displayed at the inputted keyword display field 301 of the search results display window 300 displays.

The outputting unit 6 then displays the prescribed display portion of the content of the retrieved content stored in the search results management table 44 in a list form at the search ranking display field 302 in accordance with the sort order of the search results management table 44. When the user selects one content of the listed content displayed in a list at the search ranking display unit 302 by clicking, the outputting unit 6 acquires the selected content file and displays all content of these content files at a content detail display field (not shown) or by opening at another window.

When the user inputs a new search keyword at the search keyword re-input field 303 and clicks the search-again button 304, the content searcher 5 carries out a new search of the content database 8 based on the search keyword inputted to the search keyword re-input field 303. The ranking manager 2 then carries out rank change processing as described above on the search results.

When a search keyword is inputted and the refine search button 305 is clicked, the content searcher 5 carries out the search again taking the content stored in the search results management table 44 as the range of the search. In the case of refining a search, the ranking manager 2 may also perform rank changing processing on the search results.

As described above, when a content file "C:\pcd\document.html" is retrieved as the search results by the content searcher 5, the relevancy rating of the content file "C:\pcd\document.html" is changed to a higher rating recalculated according to prescribed rules. The prescribed content of the file "C:\pcd\document.html" is then displayed in order from upper rank as in the related art at the search results display window 300. In this way, the present invention facilitate for a user to find rapidly content that he/she wishes to refer from the search results of content and solve a problem easily.

In the above, descriptions are given of practical implementations of the present invention but various modifications are possible within the scope of the present invention. For example, in these embodiments, a description is given where the search results rank changing processing program 1 of the present invention is described equipped with a content searcher 5, but the content searcher 5 may also be configured as separate processing means external to the search results rank changing processing program 1. In this case, the search results rank changing processing program 1 acquires the results of the content searcher 5 searching the content database 8 for temporary storing in the data manager 4. The ranking manager 2 then carries out rank changing processing based on the search results stored in the data manager 4.

Further, in these embodiments, a description is given where the active software manager 3 is provided with a currently active software acquisition unit 31 and an active software history acquisition unit 32. The active software manager 3, however, may be provided with just one of the currently active software acquisition unit 31 or the active software history acquisition unit 32. In this case, the data manager 4 will correspond to a processing unit provided at the active software manager 3 and may manage one of either the currently active software management table 42 or the active software history management table 43.

The operation target setting unit 21 can set content of software as an operation target by specifying one of either the content file name or the software file name, then just one of either the content file name or the software file name may be stored in the operation target management table 41.

The program implementing the present invention may be stored on an appropriate recording medium readable by computer such as portable memory media, semiconductor memory, a hard disc, or the like, and may be provided through recording on such a recording media, or through exchange utilizing various communications networks via a communications interface.

As described above, according to the present invention, with a user support content search stored on a computer, content or software arbitrarily set by a user may be set, and software active on the computer during the content search or an active software history is stored. Processing is then carried out so that content ranking of search results content is changed according to whether the content is content or software specified by the user or is software that is currently active or has been active, and the content is outputted lined up based on the ranking. As a results content of outputted search results relating to content or software set arbitrarily by the user, currently active software, or recently active software is given an upper order ranking, and the content the user wishes to refer to can be found in a more effective manner.

What is claimed is:

1. A computer-readable recording medium recording a program for changing a relevancy rating assigned to content retrieved in a content database search process, the program controlling a computer and comprising a process of:

acquiring information on software which is active on the computer during the content database search process and storing the information on the software in a currently active software management table;

calculating a relevancy rating of retrieved content by adding a prescribed value to the relevancy rating of the retrieved content when the retrieved content includes information on the software which is active on the computer according to the currently active software management table;

storing information of the retrieved content having the relevancy rating in a search results management table; and sorting the search results management table based on the relevancy rating and outputting a prescribed part of the retrieved content in sorted order.

2. The recording medium according to claim 1, the program further comprising a process of:

receiving operation target information for content, software, or both that a user has set as a desired target of relevancy rating changing and storing the operation target information in an operation target management table; and calculating the relevancy rating of the retrieved content by adding a prescribed value to the relevancy rating of the retrieved content in case the retrieved content matches with the content or the software of the operation target information stored in the operation target management table.

3. A computer-readable recording medium for recording a program for changing a relevancy rating assigned to content retrieved in a content database search process, the program controlling a computer and comprising a process of:

acquiring information on software which has been active on the computer during the immediate past while the content database search process is executed and storing the information on the software in an active software history management table;

calculating a relevancy rating of retrieved content by adding a prescribed value to the relevancy rating of the retrieved content when the retrieved content includes information for the software which has been active on the computer according to the active software history management table;

storing information of the retrieved content having the relevancy rating in a search results management table; and sorting the search results management table based on the relevancy rating and outputting a prescribed part of the retrieved content in sorted order.

4. The recording medium according to claim 3, the program further comprising the process of:

receiving operation target information for content, software, or both that a user has set as a desired target of relevancy rating changing and storing the operation target information in an operation target management table; and calculating the relevancy rating of the retrieved content by adding a prescribed value to the relevancy rating of the retrieved content in case the retrieved content matches with the content or the software of the operation target information stored in the operation target management table.

5. A method for searching a content database stored in a computer using a keyword inputted by a user, comprising:

receiving operation target information for content, software, or both that a user has set as a desired target of relevancy rating changing, and storing the operation target information in an operation target management table;

searching a content database with the keyword and retrieving content as a search result;

changing a relevancy rating of the retrieved content when the retrieved content includes information for software which is active during the database search process and when the retrieved content matches with the content of the operation target information stored in the operation target management table; and moving up an output rank of the retrieved content having the changed relevancy rating and outputting a prescribed part of the retrieved content.

6. A method for searching a content database stored in a computer using a keyword inputted by a user, comprising:

receiving operation target information for content, software, or both that a user has set as a desired target of relevancy rating changing, and storing the operation target information in an operation target management table;

receiving notification indicating software turned to be active and storing the notification in an active software history management table;

searching a content database with the keyword and retrieving content as a search result;

changing a relevancy rating of the retrieved content when the retrieved content matches with the content or relates to the software of the operation target information in the operation target management table, and when the retrieved content includes information for software which matches with the software indicated in the notification stored in the active software history management table; and moving up an output rank of the retrieved content having the changed relevancy rating and outputting a prescribed part of the retrieved content.

7. An apparatus, comprising:

means for receiving operation target information for content, software, or both that a user has set as a desired target of relevancy rating and changing, and storing the operation target information in an operation target management table;

means for searching a content database with a keyword and retrieving content as a search result;

means for changing a relevancy rating of the retrieved content when the retrieved content includes information related to software which is active during the database search process or the retrieved content matches with the content of the operation target information stored in the operation target management table; and means for moving up an output rank of the retrieved content having the changed relevancy rating and outputting a prescribed part of the retrieved content.

8. An apparatus, comprising:

means for receiving operation target information for content, software, or both that a user has set as a desired target of relevancy rating changing, and storing the operation target information in an operation target management table;

means for receiving notification indicating software turned to be active and storing the notification in an active software history management table;

means for searching a content database with a keyword and retrieving content as a search result;

means for changing a relevancy rating of the retrieved content when the retrieved content matches with the content or relates to the software of the operation target information in the operation target management table, and when the retrieved content includes information about software which matches with the software indicated in the notification stored in the active software history management table; and means for moving up an output rank of the retrieved content having a changed relevancy rating and outputting a prescribed part of the retrieved content.

* * * * *